US006629170B1

(12) United States Patent  
Davidson et al.

(10) Patent No.: US 6,629,170 B1
(45) Date of Patent: Sep. 30, 2003

(54) METHOD AND APPARATUS FOR A BYTE LANE SELECTABLE PERFORMANCE MONITOR BUS

(75) Inventors: Joel Roger Davidson, Austin, TX (US); Michael Stephen Floyd, Leander, TX (US); Paul Joseph Jordan, Austin, TX (US); Judith E. K. Laurens, Bastrop, TX (US); Alexander Erik Mericas, Austin, TX (US); Kevin F. Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,110

(22) Filed: Nov. 8, 1999

(51) Int. Cl.[7] .............................................. G06F 13/00
(52) U.S. Cl. ...................... 710/100; 710/262; 710/305; 711/31; 711/130; 712/218; 714/37; 714/47; 702/176; 702/181; 702/182; 702/186
(58) Field of Search ................... 711/31, 130; 710/100, 710/262, 305; 714/47, 37; 702/176, 181, 182, 186; 712/218

(56) References Cited

U.S. PATENT DOCUMENTS

| | | | | |
|---|---|---|---|---|
| 5,557,548 A | * | 9/1996 | Gover et al. ................. | 702/176 |
| 5,632,023 A | * | 5/1997 | White et al. ................. | 712/218 |
| 5,669,010 A | * | 9/1997 | Duluk, Jr. .................... | 708/192 |
| 5,675,729 A | * | 10/1997 | Mehring ....................... | 714/37 |
| 5,691,920 A | * | 11/1997 | Levine et al. ................ | 702/186 |
| 5,752,062 A | * | 5/1998 | Gover et al. .................. | 714/37 |
| 5,797,019 A | * | 8/1998 | Levine et al. ................ | 710/262 |
| 5,822,758 A | * | 10/1998 | Loper et al. ................. | 711/130 |
| 5,875,119 A | * | 2/1999 | Bauman et al. ............. | 702/181 |
| 5,938,760 A | | 8/1999 | Levine et al. ............... | 712/220 |
| 5,970,439 A | * | 10/1999 | Levine et al. ............... | 702/182 |
| 6,067,644 A | * | 5/2000 | Levine et al. ................. | 714/47 |
| 6,112,318 A | * | 8/2000 | Jouppi et al. ................. | 714/47 |
| 6,263,298 B1 | * | 7/2001 | Kerman et al. ............. | 702/186 |
| 6,275,782 B1 | * | 8/2001 | Mann .......................... | 702/182 |

OTHER PUBLICATIONS

M. Morris Mano, Computer System Architecture, 1982, Englewood Cliffs, N.J., 2nd edition, pp. 53–54.*

* cited by examiner

Primary Examiner—Gopal C. Ray
Assistant Examiner—Justin King
(74) Attorney, Agent, or Firm—Duke W. Yee; Mark E. McBurney; Lisa L. B. Yociss

(57) ABSTRACT

A multi-stage byte lane selectable bus. In a preferred embodiment, the bus in performance monitor mode includes a plurality of byte lanes and a selection mechanism. The selection mechanism acquires, from a plurality of signals, a subset of those signals, which are desired to be monitored, and places this subset of signals on the byte lanes that are input to the PMU. The number of the plurality of signals that potentially may be monitored is greater than the number of byte lanes and is also greater than the number of PMU counters.

20 Claims, 3 Drawing Sheets

METHOD AND APPARATUS FOR A BYTE LANE SELECTABLE PERFORMANCE MONITOR BUS

BACKGROUND OF THE INVENTION

1. Technical Field

The present invention relates generally to computer architecture and, more specifically, to methods for dynamically configuring bus byte lanes.

2. Description of Related Art

In typical computer systems utilizing processors, system developers desire optimization of execution software for more effective system design. Usually, studies of a program's access patterns to memory and interaction with a system's memory hierarchy are performed to determine system efficiency. Understanding the memory hierarchy behavior aids in developing algorithms that schedule and/or partition tasks, as well as distribute and structure data for optimizing the system.

Performance monitoring is often used in optimizing the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. The performance monitor can also be used to provide counts of the number of occurrences of selected events in a processing system. The information produced usually guides system architects toward ways of enhancing performance of a given system or of developing improvements in the design of a new system.

Current architectures for performance monitors utilize a method whereby all signals are simultaneously routed to the central performance monitor unit. However, this increases the chip area required to implement the performance monitor and increases the wiring congestion. Furthermore, having all signals simultaneously routed to the performance monitor unit limits the number of signals delivered to the performance monitor. Therefore, a circuit architecture for a performance monitor that decreases chip area and wiring congestion is desirable. Furthermore, it is desirable to have a performance monitor bus that can potentially provide a larger number of signals to a performance monitor unit than is possible with current performance monitor signal routing designs.

SUMMARY OF THE INVENTION

The present invention provides a byte lane selectable performance monitor bus. In a preferred embodiment, the performance monitor bus includes a plurality of byte lanes and a selection unit. The selection unit selects, from a plurality of signals, a smaller subset of these signals, which are desired to be monitored, and places this subset of signals on the byte lanes. The number of the plurality of signals that potentially may be monitored is greater than the number of byte lanes.

In one preferred embodiment, four selection stages are utilized to select a 32-bit input for a performance monitor unit from multiple 64-bit signal groups. Each selection stage utilizes four multiplexers. The first stage of multiplexers selects four 64-bit signals from a plurality of sources. Each of the four 64-bit signals is broken up into an upper and lower 32-bits from which the second stage of four multiplexers chooses either the upper or lower 32-bits. Each of the 32-bit outputs from the second stage is broken up into four 8-bit components which are fed into a third selection stage.

The third selection stage comprises four multiplexers. The inputs to the first multiplexer are the first 8-bits from each of the outputs of the second selection stage. The inputs to the second multiplexer are the second 8-bits from each one of the outputs of the second stage. The inputs of the third and fourth multiplexer stages are chosen similarly. Each of the four multiplexers in the third selection stage selects one of the four inputs as an 8-bit output.

A fourth selection stage also comprises four multiplexers. These multiplexers select either the 8-bit output from the third selection stage or an 8-bit signal from the memory system. The chosen output is placed on four byte lanes, which are the input to a performance monitor unit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
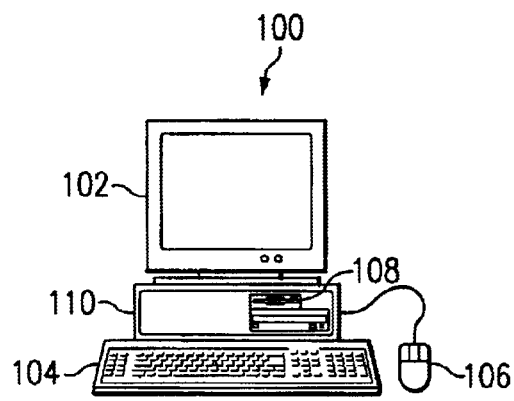
FIG. 1 depicts a pictorial representation of a data processing system in which the present invention may be implemented.

With reference now to FIG. 1, a pictorial representation depicts a data processing system in which the present invention may be implemented. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, servers, work stations, network computers, Internet appliances, palm computers, etc. System unit 110 comprises memory, a central processing unit, I/O unit, etc. However, in the present invention, system unit 110 contains a speculative processor, either as the central processing unit or as one of multiple CPUs present in the system unit.

Figure 2A:
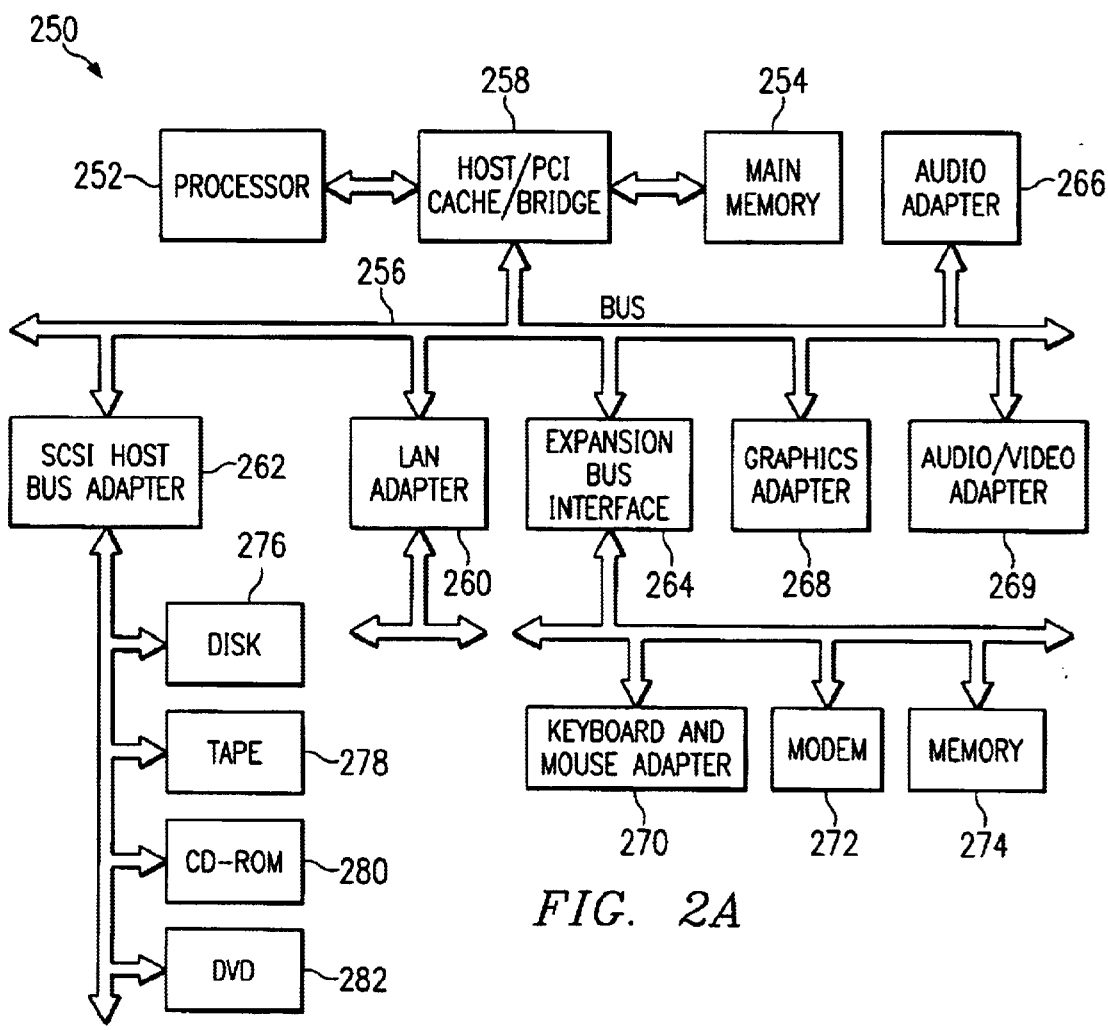
FIG. 2A depicts a block diagram of a data processing system in which the present invention may be implemented.

With reference now to FIG. 2A, a block diagram of a data processing system in which the present invention may be implemented is illustrated. Data processing system 250 is an example of a computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 256 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, CD-ROM 280, and DVD 282 in the depicted example. Typical PCI local bus implementations will support three or four PCI expansion slots or add-in connectors.

An operating system runs on processor 252 and is used to coordinate and provide control of various components within data processing system 250 in FIG. 2A. The operating system may be a commercially available operating system such as Java OS or OS/2, which are available from International Business Machines Corporation. An object oriented programming system such as Java may run in conjunction with the operating system and provides calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Often times, hard disk drives are absent and memory is constrained when data processing system 250 is used as a network client.

Those of ordinary skill in the art will appreciate that the hardware in FIG. 2A may vary depending on the implementation. For example, other peripheral devices, such as optical disk drives and the like may be used in addition to or in place of the hardware depicted in FIG. 2A. The depicted example is not meant to imply architectural limitations with respect to the present invention. For example, the processes of the present invention may be applied to a multiprocessor data processing system.

Figure 2B:
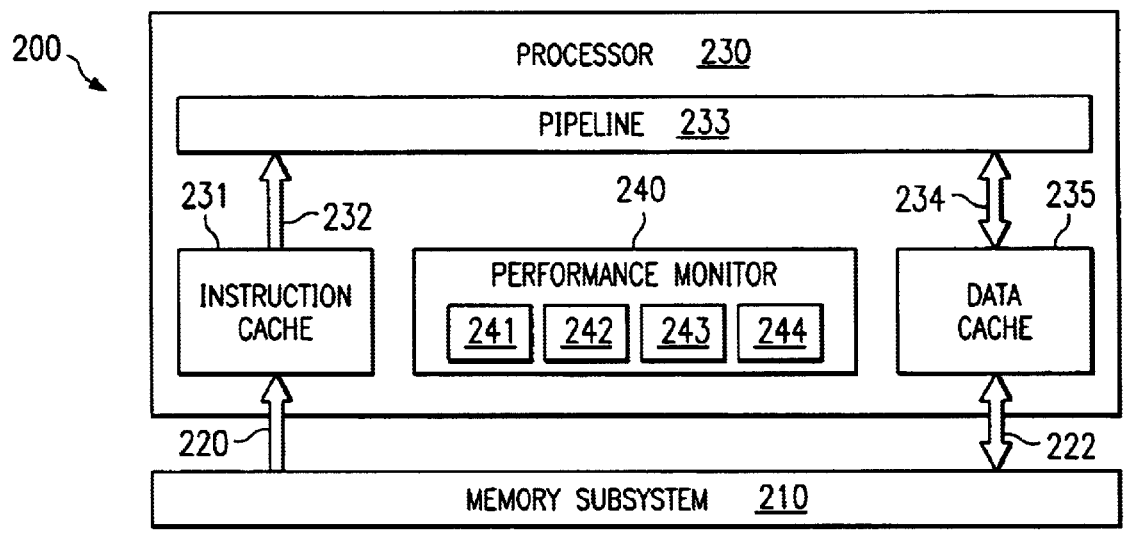
FIG. 2B depicts a block diagram of selected functional units of a processor system that may include the present invention.

With reference now to FIG. 2B, a block diagram depicts selected functional units of a processor system that may include the present invention. System 200 comprises memory subsystem 210 and processor 230.

Data and instructions may be transferred to processor 230 from the memory subsystem 210 on instruction transfer path 220 and data transfer path 222. Instruction transfer path 220 and data transfer path 222 may be implemented as a single bus or as separate buses between processor 230 and memory subsystem 210. Alternatively, a single bus may transfer data and instructions between processor 230 and memory subsystem 210 while processor 230 provides separate instruction and data transfer paths within processor 230, such as instruction bus 232 and data bus 234.

Processor 230 also comprises instruction cache 231, data cache 235, performance monitor 240, and instruction pipeline 233. Performance monitor 240 comprises performance monitor muxes 241, performance monitor counters 242, performance monitor control registers 243, and performance monitor control logic 244. Alternatively, processor 230 may have other counters and control registers not shown.

Processor 230 includes a pipelined processor capable of executing multiple instructions in a single cycle, such as the PowerPC family of reduced instruction set computing (RISC) processors. During operation of system 200, instructions and data are stored in memory subsystem 210. Instructions to be executed are transferred to instruction pipeline 233 via instruction cache 231. Instruction cache 231 contains instructions that have been cached for execution within pipeline 233. Some instructions transfer data to or from memory subsystem 210 via data cache 235. Other instructions may operate on data loaded from memory or may control the flow of instructions.

Performance monitor 240 comprises event detection and control logic, including counters 242, control registers 243, and control logic 244. Performance monitor 240 is a software-accessible mechanism intended to provide detailed information with significant granularity concerning the utilization of processor instruction execution and storage control. The performance monitor may include an implementation-dependent number of performance monitor counters used to count processor/storage related events. These counters may also be termed "global counters". The control registers establish the function of the counters with each control register usually controlling some number of counters. The control registers may also establish the configuration of selected core and memory subsystem performance monitor-related muxes. The counters and the control registers are typically special purpose registers physically residing on the processor. These registers are accessible for read or write operations via special instructions for that purpose. The write operation is preferably only allowed in a privileged or supervisor state, while reading is preferably allowed in a problem state since reading the special purpose registers does not change a register's content. In a different embodiment, these registers may be accessible by other means such as addresses in I/O space. In the preferred embodiment, the counters are 32-bits and the control registers are either 32-bit or 64-bit registers. One skilled in the art will appreciate that the size of the counters and the control registers is dependent upon design considerations, including the cost of manufacture, the desired functionality of processor 230, and the chip area available within processor 230.

Performance monitor 240 monitors the entire system and accumulates counts of events that occur as the result of processing instructions. In the present invention, processor 230 allows instructions to execute out-of-order with respect to the order in which the instructions were coded by a programmer or were ordered during program compilation by a compiler. Processor 230 may also employ speculative execution to predict the outcome of conditional branches of certain instructions before the data on which the certain instructions depend is available. The performance monitor control registers are partitioned into bit fields that allow for event/signal selection to be recorded/counted. Selection of an allowable combination of events causes the counters to operate concurrently. When the performance monitor is used in conjunction with instructions executed out-of-order in the manner provided by the present invention, the performance monitor may be used as a mechanism to monitor the performance of the stages of the instruction pipeline.

Figure 3:
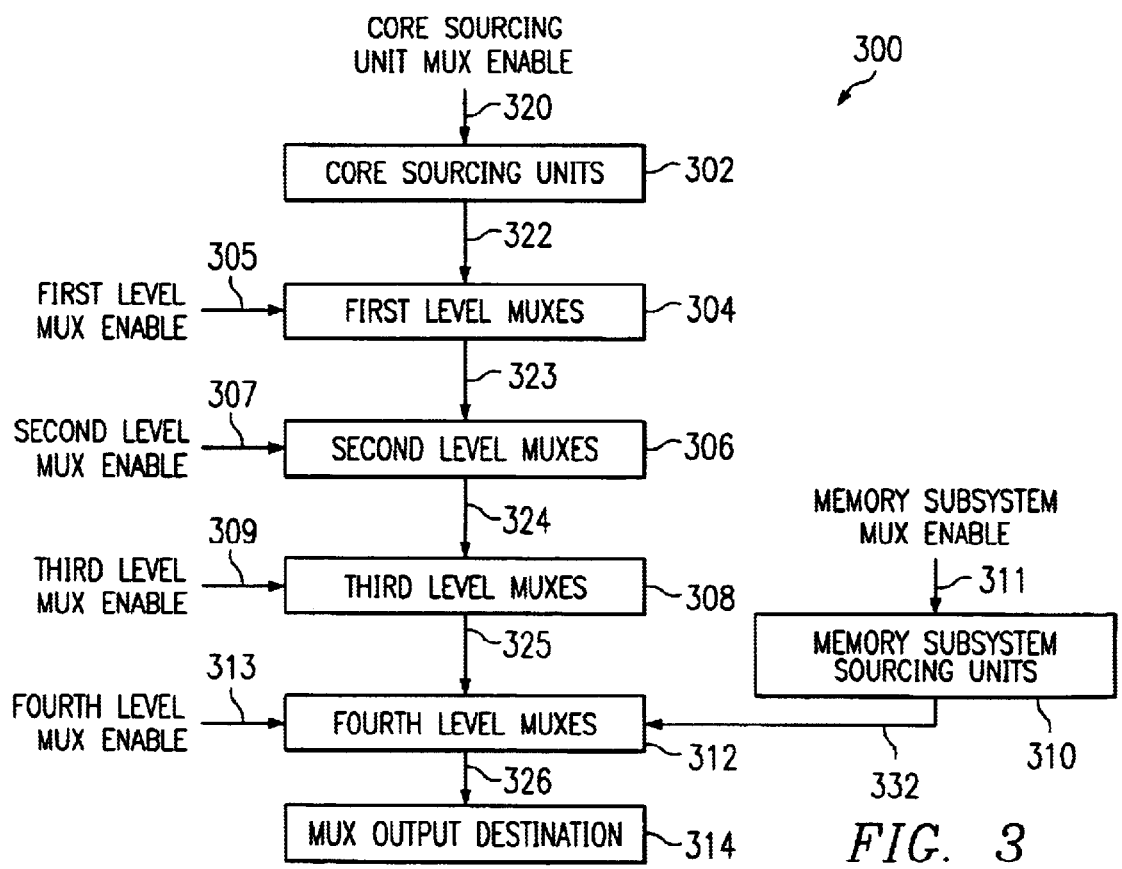
FIG. 3 depicts an example representation of one configuration of functional units connected to a multi-level bus of a processor system that may include the present invention; and, FIG. 4 depicts a block diagram illustrating an example of a multi-stage byte lane selectable bus according to the present invention.

With reference now to FIG. 3, a block diagram illustrating an example representation of one configuration of a multi-stage byte lane selectable bus that can deliver signals as selected by the sourcing units to a target destination is depicted according to the present invention.

System 300 comprises core sourcing units 302, core sourcing unit mux source enable 320, first level muxes 304, first level mux enable 305, second level muxes 306, second level mux enable 307, third level muxes 308, third level mux enable 309, memory subsystem sourcing unit 310, memory subsystem sourcing ,unit mux enable 311, fourth level muxes 312, fourth level mux enable 313, mux output destination 314, multiple stages of a core byte lane 30 selectable bus 322–326, and memory subsystem bus 332. Core sourcing units 302 select signals as determined by core sourcing unit mux enable 320. Selected signals may be transferred to first level muxes 304 from the sourcing units 302 on first stage core byte lane selectable bus 322. First stage core byte lane selectable bus 322 may be implemented as a single bus or as separate buses between core sourcing units 302 and first level muxes 304.

First level muxes 304 select signals as determined by first level mux enable 305. Selected signals may be transferred to second level muxes 306 from first level muxes 304 on second stage core byte lane selectable bus 323. Second stage core byte lane selectable bus 323 may be implemented as a single bus or as separate buses between first level muxes 304 and second level muxes 306.

Second level muxes 306 select signals as determined by second level mux enable 307. Selected signals may be transferred to third level muxes 308 from second level muxes 306 on third stage core byte lane selectable bus 324. Third stage core byte lane selectable bus 324 may be implemented as a single bus or as separate buses between second level muxes 306 and third level muxes 308.

Third level muxes 308 select signals as determined by third level mux enable 309. Selected signals may be transferred to fourth level muxes 312 from third level muxes 308 on fourth stage core byte lane selectable bus 325. Fourth stage core byte lane selectable bus 325 may be implemented as a single bus or as separate buses between third level muxes 308 and fourth level muxes 312.

Memory subsystem sourcing units 310 select signals as determined by memory subsystem sourcing unit enable 311. Selected signals may be transferred to fourth level muxes 312 from memory subsystem sourcing units 310 on memory subsystem bus 332. Memory subsystem bus 332 may be implemented as a single bus or as separate buses between memory subsystem sourcing units 310 and fourth level muxes 312.

Fourth level muxes 312 select signals as determined by fourth level mux enable 313. Selected signals may be transferred to mux output destination 314 from fourth level muxes 312 on fifth stage core byte lane selectable bus 326. Fifth stage core byte lane selectable bus 326 may be implemented as a single bus or as separate buses between fourth level muxes 312 and mux output destination 314.

Figure 4:
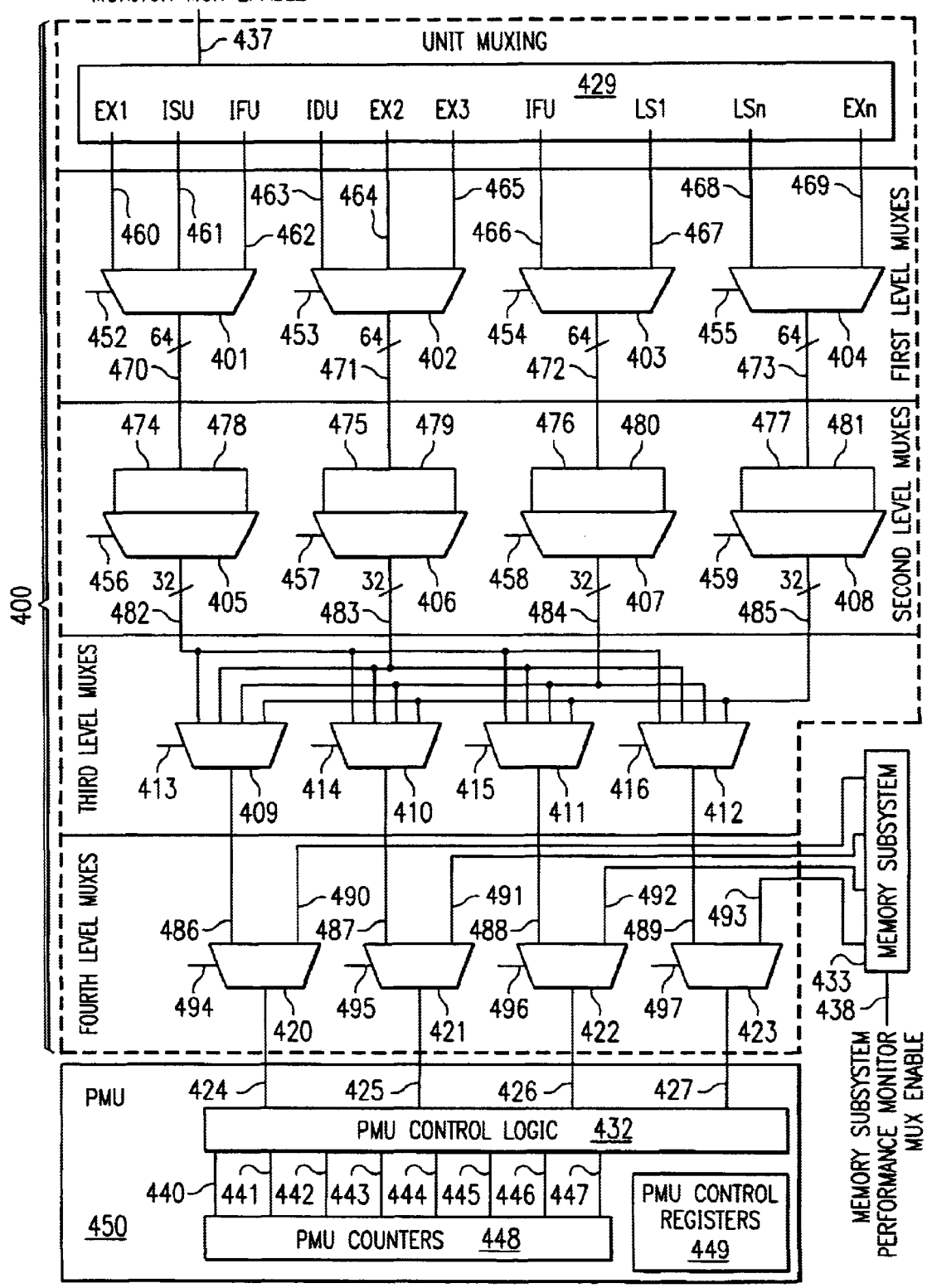

With reference now to FIG. 4, a block diagram illustrating an example of a multi-stage byte lane selectable bus and a performance monitor unit is depicted according to the present invention.

Component 400 comprises core sourcing units 429, performance monitor mux enable 437, first stage core byte lane selectable buses 460–469, first level muxes 401–404, first level mux enables 452–455, second stage core byte lane selectable buses 470–481, second level muxes 405–408, second level mux enables 456–459, third stage core byte lane selectable buses 482–485, third level muxes 409–412, third level mux enables 413–416, fourth stage core byte lane selectable buses 486–489, memory subsystem buses 490–493, fourth level muxes 420–423, fourth level mux enables 494–497, fifth stage buses 424–427, memory subsystem 433, and memory subsystem performance monitor mux enable 438.

Performance monitor unit (PMU) 450 comprises PMU control logic 432, PMU control logic outputs 440–447, PMU counters 448, and PMU control registers 449. The PMU 450 is an example of a performance monitor unit to which multi-stage byte lane selectable bus 400 may be connected.

Core performance monitor mux enable 437 is used to put core units 429 into performance monitor mode in which the multiplexers internal to each core unit select the set of signals designated to go to performance monitor unit 450. Likewise, memory subsystem performance monitor mux enable 438 is used to put memory subsystem 433 into performance monitor mode in which the multiplexers internal to the memory subsystem select the set of signals designated to go to performance monitor unit 450. Note that byte lane selectable bus 400 in this embodiment can serve multiple purposes and carries signal groups as determined by mux enable 437. Likewise, memory subsystem bus 490–493 carries signal groups as determined by mux enable 438.

In the depicted example, data originate from core units 429 as a plurality of 64-bit signal groups routed through a sequence of muxes 401–412 to form 32-bit signal group 486–489. Likewise, 32-bit signal group 490–493 originates from memory subsystem 433. The 32-bit signal group selected by muxes 420–423 is input 424–427 to performance monitor unit 450.

In the depicted example, the core units from which the core unit buses 460–469 originate are execution unit 1 (EX1), instruction sequence unit (ISU), instruction fetch unit (IFU), instruction decode unit (IDU), execution unit 2 (EX2), execution unit 3 (EX3), instruction fetch unit (IFU), load store unit 1 (LS1), load store unit 2 (LS2), and execution unit n (EXn). As is shown in the depicted example, it is possible that a core unit 64-bit signal group may be routed to inputs at more than one of muxes 401–404. The set of core units 429 may be replaced with other sets of core units which include different core units, more core units, or fewer core units depending on the implementation. The core units from which core unit buses 460–469 originate are some of the possible units within a processor and are given merely as examples.

The first core signal selection stage comprises four muxes 401–404 and four mux enables 452–455 for selecting four of the 64bit signal groups 460–469— one group selected by each of muxes 401–404— for delivery to the second core signal selection stage 470–473. As shown, muxes 401–402 have three inputs, and muxes 403–404 have two inputs. However, if it is desired to have the capability to monitor more core units, then the number of inputs to muxes 401–404 could be increased. For example, muxes 401–404 each could have up to four core units (each core unit providing a 64-bit signal group as input) and each could select one 64-bit signal group for output as determined by the respective mux enables 452–455. Furthermore, the number of 64-bit signal inputs to any of muxes 401–404 is independent of the number of 64-bit signal inputs to any other of muxes 401–404.

In the second core signal selection stage the output 470–473 of each of muxes 401–404 is split into upper 32-bit signal group 474–477 and lower 32-bit signal group 478–481. The second core signal selection stage comprises four muxes 405–408 and four mux enables 456–459. Each of muxes 405–408 receives the upper 32-bit signal group input and the lower 32-bit signal group input from the respective output 470–473 of muxes 401–404. Thus, each of muxes 405–408 passes either the upper or the lower 32-bit signal group of the 64-bit input 470–473 as determined by the mux enables 456–459.

The third core signal selection stage comprises four muxes 409–412. The inputs to the third core signal selection stage consist of four 32-bit signal groups 482–485 which can originate from up to four different core units 429. The output 486–489 of the third core signal selection stage is one 32-bit signal group composed of four 8-bit signal groups selected by muxes 409–412 as determined by mux enables 413–416. Each of 32-bit signal groups 482–485 is composed of four 8-bit signal groups formed as signals 0–7, signals 8–15, signals 16–23, and signals 24–31. The first 8-bit signal group (signals 0–7) from each of 482–485 is directed to the four inputs of mux 409. The second 8-bit signal group (signals 8–15) from each of 482–485 is directed to the four inputs of mux 410. The third 8-bit signal group (signals 16–23) from each of 482–485 is directed to the four inputs of mux 411. The fourth 8-bit signal group (signals 24–31) from each of 482–485 is directed to the four inputs of mux 412. Thus, mux 409 passes signals 0–7 from one of 482–485, mux 410 passes signals 8–15 from one of 482–485, mux 411 passes signals 16–23 from one of 482–485, and mux 412 passes signals 24–31 from one of 482–485 as determined by respective mux enables 413–416.

The fourth signal selection stage comprises four muxes 420–423. The inputs to the fourth signal selection stage consist of four 8-bit signal groups 486–489 from core units 429 and four 8-bit signal groups 490–493 from memory subsystem 433. Output 424–427 of the fourth signal selection stage is four 8-bit signal groups as determined by respective mux enables 494–497.

Signal groups 424–427 are the inputs to PMU control logic 432. Thus, the total number of signals input to PMU unit 450 from multi-stage byte lane selectable bus 400 is 32. This is a number less than the total number of signals that may potentially be monitored.

Past performance monitor buses utilized a full crossbar switch dedicated to just the PMU, which allowed all signals to be simultaneously routed to the PMU and then muxed down to the number of signals that could be accommodated by the number of PMU counters implemented. However, it is not technically feasible to physically run a large number of wires from all parts of a large VLSI chip for the use of a single unit, especially a performance monitor unit. In past solutions, the number of signals that could be brought to the PMU using direct wires for each of the signals to be monitored was limited by the area required for the wires themselves, by the timing problems associated with such wiring, and by the area required for the muxes needed to reduce the total number of signals being input to the PMU down to the much smaller number of signals that could be recorded by the counters implemented for the PMU.

The byte lane selectable bus structure of the present invention distributes the muxes and the physical area involved in bringing signals to the PMU into multiple areas of the chip other than the PMU. Because only signals that are "interesting" to see at the same time need to be simultaneously available to the PMU and not all signals are required simultaneously, the present multi-stage byte lane selectable bus meets that need potentially allowing a much larger number of signals to be included in the set of signals that might be monitored. In this embodiment, a group of 32 signals can be selected and brought to the PMU simultaneously for use by the PMU counters.

It is important to note that the number of muxes in each stage of PMU mode byte lane selectable bus 400 was chosen because of other uses of the bus. Specifically, in debug mode four trace arrays are physically instantiated in this embodiment. Since performance monitor mode maps onto and shares the underlying bus structure, the PMU also has to utilize the four muxes that support debug mode. However, if a different number of trace arrays was physically instantiated, then the number of muxes utilized by the PMU would correspond to that number.

It is also important to note that while the present invention has been described primarily with reference to four mux selection stages of the multi-stage byte lane selectable bus, the signal selection function could also be performed with fewer or more selection stages depending on the specific implementation and other constraints.

However, one aspect of the multi-stage byte lane selectable bus that is significant to this embodiment is the fact that this bus structure and associated muxes are used for other signal delivery functions than just those of the PMU. This reuse of the bus structure allows a reduction in the total chip resource that would be used were these same signal delivery functions implemented as distinct delivery functions for each such system.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A byte lane selectable performance monitor bus included within a semiconductor substrate, comprising:

a plurality of byte lanes included within said semiconductor substrate configured for functional connection to a performance monitor unit, said performance monitor unit being located in a first area of said semiconductor substrate;

a plurality of selection stages included within said semiconductor substrate functionally connected to the plurality of byte lanes;, wherein the plurality of selection stages selects, from a plurality of signals, monitored signals to be placed on the byte lanes, wherein the number of the plurality of signals is greater than the number of the plurality of byte lanes and wherein each stage of the plurality of selection stages progressively reduces the number of the plurality of signals sent to the next stage;

wherein said plurality of signals excludes enable signals for enabling said plurality of selection stages for indicating a time to select signals for sampling; and said plurality of selection stages being distributed throughout said semiconductor substrate such that ones of said plurality of selection stages are located in areas of said semiconductor substrate which are not in proximity to said first area of said semiconductor substrate, wherein only selected only of said plurality of signals are received within said first area.

2. The performance monitor bus as recited in claim 1, wherein:

the plurality of selection stages include a first and a second selection stage;

the first selection stage selects a plurality of first signals from the plurality of signals and sends first selected signals to the second selection stage, wherein the plurality of signals is originated from a plurality of core units within a processor; and the second selection stage selects, from the plurality of first signals, a plurality of second signals and places one of the plurality of second signals on each of the byte lanes.

3. The performance monitor bus as recited in claim 2, wherein each of the first and second selection stages includes four multiplexers.

4. The performance monitor bus as recited claim 2, wherein:

the plurality of selection stages further includes a third and a fourth selection stage;

the third selection stage includes a plurality of multiplexers;

each of said plurality of multiplexers has inputs connected to each of said outputs from said second selection stage;

each of said plurality of multiplexers passes a different group of bits from said second selection stage; and the fourth selection stage selects between signals received from the third stage and signals received from a memory subsystem and sends selected signals to the performance monitor unit.

5. The performance monitor bus as recited in claim 1, further comprising a performance monitor select signal, wherein the bus performs other functions when the performance monitor select signal is disabled and carries performance monitor signals when the performance select signal is enabled.

6. A method of delivering signals to a performance monitor unit within a semiconductor substrate, comprising the steps of:

said performance monitor unit being located in a first area of said semiconductor substrate;

providing a plurality of selection stages in said semiconductor substrate, selecting in a first one of said plurality of selection stages, from a plurality of signals a first group of signals;

wherein said plurality of signals excludes enable signals for enabling said plurality of selection stages for indicating a time to select signals for sampling;

progressively reducing the number of signals from the first group of signals in a multi-stage process to produce a final group of signals configured for delivery to the performance monitor unit; and said plurality of selection stages being distributed throughout said semiconductor substrate such that ones of said plurality of selection stages are located in areas of said semiconductor substrate which are not in proximity to said first area of said semiconductor substrate, wherein only selected ones of said plurality of signals are received within said first area.

7. The method as recited in claim 6, wherein each of said plurality of signals is 64 bits wide and wherein said first group of signals comprises four 64 bit wide signals.

8. The method as recited in claim 6, wherein tie plurality of selection stages includes a second stage, a third stage, and a fourth stage.

9. The method as recited in claim 8, wherein each stage includes four multiplexers.

10. The method as recited claim 8, wherein the second stage selects one-half of each of said group of signals to produce a second group of signals and sends the second group of signals to the third stage.

11. The method as recited in claim 10, wherein the third stage divides each of said second group of signals into a respective first signal section, second signal section, third signal section and fourth signal section, and wherein one of said First signal section, second signal section, third signal section and fourth signal section is output as a third group of signals from the third stage to the fourth stage.

12. The method as recited in claim 11, wherein the fourth stage selects from the third group of signals and from signals from a memory subsystem.

13. A system of delivering signals to a performance monitor unit included in a semiconductor substrate, comprising:

said performance monitor unit being located in a first area of said semiconductor substrate;

providing a plurality of selection stages in said semiconductor substrate, means for selecting, in a first one of said plurality of selection stages, from a plurality of signals a first group of signals;

wherein said plurality of signals excludes enable signals for enabling said plurality of selection stages for indicating a time to select signals for sampling;

means for progressively reducing the number of signals from the first group of signals in a multi-stage process to produce a final group of signals configured for delivery to the performance monitor unit; and said plurality of selection stages being distributed throughout said semiconductor substrate such that ones of said plurality of selection stages are located in areas of said semiconductor substrate which are not in proximity to said first area of said semiconductor substrate, wherein only selected ones of said plurality of signals are received within said first area.

14. The system as recited in claim 13, wherein each of said plurality of signals is 64 bits wide and wherein said first group of signals comprises four 64 bit wide signals.

15. The system as recited in claim 13, wherein the plurality of selection stages includes a second stage, a third stage, and a fourth stage.

16. The system as recited in claim 15, wherein each stage includes four multiplexers.

17. The system as recited in claim 15, wherein the second stage selects one-half of each of said group of signals to produce a second group of signals and sends the second group of signals to the third stage.

18. The system as recited in claim 17, wherein the third stage divides each of said second group of signals into a respective first signal section, second signal section, third signal section and fourth signal section, and wherein one of said first signal section, second signal section, third signal section and fourth signal section is output as a third group of signals from the third stage to the fourth stage.

19. The system as recited in claim 18, wherein the fourth stage selects from the third group of signals and from signals from a memory subsystem.

20. A byte-lane selectable performance monitor bus included in a semiconductor substrate, comprising:

a plurality of 64 bit signals from a plurality of core units;

wherein said plurality of 64 bit signals excludes enable signals for enabling said plurality of selection stages for indicating a time to select signals for sampling;

a performance monitor unit being located in a first area of said semiconductor substrate;

a plurality of selection stages including a first selection stage, a second selection stage, a third selection stage, and a fourth selection stage, said plurality of selection stages being distributed throughout said semiconductor substrate such that ones of said plurality or selection stages arc located in areas of said semiconductor substrate which are not in proximity to said first area of said semiconductor substrate, wherein only selected ones of said plurality of signals are received within said first area;

said first selection stage including four first multiplexers, wherein each of the four multiplexers selects one of said plurality of 64 bit signals as a first output;

said second selection stage including four second multiplexers wherein each of said four second multiplexers selects either an upper or a lower 32 bits from a respective one of said first output to produce a second output;

said third selection stage including four third multiplexer wherein each of said second outputs is split into a first part, a second part, a third part, and a fourth part each of which is 8 bits, wherein all of said first parts are input into a first or said fourth third multiplexers, all of said second parts are input into a second of said four third multiplexers, all of said third parts are input into a third of said four third multiplexers, and all of said fourth parts are input into a fourth of said four third multiplexers, and wherein each of said four third multiplexers generates an 8 bits third output; and said fourth selection stage including four fourth multiplexers wherein each of said four fourth multiplexers receives two inputs, one each from a respective one of said third outputs and one each from a respective one of group of signals from a memory subsystem aid wherein each of said four fourth multiplexers produces a final output wherein the final output is selected from one of the two inputs.

\* \* \* \* \*

UNITED STATES PATENT AND TRADEMARK OFFICE
CERTIFICATE OF CORRECTION

PATENT NO.    : 6,629,170 B1
DATED         : September 30, 2003
INVENTOR(S)   : Davidson et al.

It is certified that error appears in the above-identified patent and that said Letters Patent is hereby corrected as shown below:

Column 8,
Line 62, after "byte" delete "lanes;," and insert -- lanes, --.

Column 9,
Line 12, after "selected" delete "only" and insert -- ones --.
Line 30, after "recited" insert -- in --.
Line 49, after "performance" insert -- monitor --.
Line 58, after "selecting" insert -- , --.

Column 10,
Line 13, after "wherein" delete "tie" and insert -- the --.
Line 18, after "recited" insert -- in --.
Line 26, after "said" delete "First" and insert -- first --.

Column 11,
Line 23, after "plurality" delete "or" and insert -- of --.
Line 24, after "stages" delete "arc" and insert -- are --.

Column 12,
Line 9, after "four third" delete "multiplexer" and insert -- multiplexers --.
Line 13, after "first" delete "or said fourth" and insert -- of said four --
Line 24, after "subsytem" delete "aid" and insert -- and --.

Signed and Sealed this

Twenty-first Day of June, 2005

JON W. DUDAS
*Director of the United States Patent and Trademark Office*